US011397848B1

(12) United States Patent
Vagell

(10) Patent No.: US 11,397,848 B1
(45) Date of Patent: Jul. 26, 2022

(54) SYSTEMS AND METHODS FOR STACKING MARGINAL ANNOTATIONS

(71) Applicant: Google LLC, Mountain View, CA (US)

(72) Inventor: Vance Julius Vagell, Kew Gardens, NY (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/877,215

(22) Filed: May 18, 2020

Related U.S. Application Data

(63) Continuation of application No. 16/056,256, filed on Aug. 6, 2018, now Pat. No. 10,657,319, which is a continuation of application No. 14/598,855, filed on Jan. 16, 2015, now Pat. No. 10,042,832.

(51) Int. Cl.
G06F 40/169 (2020.01)
G06F 40/103 (2020.01)

(52) U.S. Cl.
CPC .......... G06F 40/169 (2020.01); G06F 40/103 (2020.01)

(58) Field of Classification Search
CPC ............................. G06F 40/169; G06F 40/103
See application file for complete search history.

(56) References Cited

U.S. PATENT DOCUMENTS

| 6,438,564 | B1 | 8/2002 | Morton et al. | |
| 7,836,390 | B2 * | 11/2010 | Lin | G06F 40/169 |
| | | | | 715/230 |
| 8,510,646 | B1 | 8/2013 | Young et al. | |
| 2007/0055926 | A1 * | 3/2007 | Christiansen | G06Q 10/10 |
| | | | | 715/210 |
| 2008/0209549 | A1 * | 8/2008 | Ishigaki | G06F 16/93 |
| | | | | 726/21 |
| 2011/0289404 | A1 | 11/2011 | Fleur et al. | |
| 2013/0097481 | A1 * | 4/2013 | Kotler | G06F 3/04842 |
| | | | | 715/230 |
| 2013/0318465 | A1 | 11/2013 | Cheng et al. | |
| 2014/0204119 | A1 | 7/2014 | Malamud et al. | |
| 2015/0079963 | A1 | 3/2015 | Sun et al. | |

FOREIGN PATENT DOCUMENTS

JP 2005202596 B2 7/2005

OTHER PUBLICATIONS

Matthews et al., Microsoft® Word 2013 Quicksteps, Chapter 10, 3rd Edition, Apr. 2013, McGraw-Hill, 26 pages (Year: 2013).*
Gotzelmann et al., "Agent-Based Annotation of Interactive 3D Visualizations," 2006 SG, LNCS 4073, pp. 24-35.
Matthew et al., Microsoft Word 2013 Quicksteps, Chapter 10, 3rd Edition, Apr. 2013, McGraw-Hill, 26 pages (Year: 2013).

* cited by examiner

*Primary Examiner* — Scott T Baderman
*Assistant Examiner* — Seung Woon Jung
(74) *Attorney, Agent, or Firm* — Lowenstein Sandler LLP

(57) ABSTRACT

A presentation of a first metadata region of a plurality of metadata regions in a first position and a second metadata region of the plurality of metadata regions in a second position of a margin of the electronic document is provided. An event indicative of a potential overlap of two or more of the plurality of metadata regions is detected. Responsive to detecting the event indicative of the potential overlap of the two or more of the plurality of metadata regions, a presentation of a stacked metadata region in the margin of the electronic document is provided. The stacked metadata region combines the first metadata region and the second metadata region.

20 Claims, 7 Drawing Sheets

400

DISPLAY OF MARKUP VERSION OF DOCUMENT — 1254

During development of a document, it is often desirable to have [multiple] users propose changes and comment on a draft of the electronic document. [For example, an author may create an initial draft of an electronic document and send a copy of the electronic document to one or more reviewers to make comments, or changes in the document.] These changes and comments may be displayed in a markup manner in a view of the document, such that indications of the changes and comments are displayed in a margin of the view. The margin has limited space. When there are many changes and comments that are made to the document, the indications of the changes and comments in the margin may be positioned far from the portions of the document that they reference.

[Systems and methods are disclosed herein for combining annotations in a document.] One aspect relates to a system or method for combining a first annotation and a second annotation to form a stacked annotation in an electronic document. The first annotation is received and corresponds to a first portion of the electronic document. The second annotation is received and corresponds to a second portion of the electronic document, wherein the first portion precedes the second portion in the electronic document. A position of a layout rendering of the first annotation is determined. The position of the layout rendering of the first annotation is compared to a position of the second portion in the electronic document. When the position of the layout rendering of the first annotation is below the position of the second portion of the

— 574

— 440
3 ANNOTATIONS
USERS A, B, D

— 430
USER C
ADDITION: 11:21 AM, TODAY
"Systems and methods are disclosed herein for combining annotations in a document."

SYSTEMS AND METHODS FOR STACKING MARGINAL ANNOTATIONS

RELATED APPLICATIONS

This application is a continuation application of U.S. patent application Ser. No. 16/056,256, filed Aug. 6, 2018, which is a continuation application of U.S. patent application Ser. No. 14/598,855, filed Jan. 16, 2015, now U.S. Pat. No. 10,042,832, the entire contents of which are hereby incorporated by reference herein.

FIELD OF THE INVENTION

In general, this disclosure relates to electronic documents, in particular, to systems and methods for stacking marginal annotations in a document editor.

BACKGROUND

During development of an electronic document, it is often desirable to have multiple users propose changes and comment on a draft of the electronic document. For example, an author may create an initial draft of an electronic document and send a copy of the electronic document to one or more reviewers to make comments or changes in the document. These changes and comments may be displayed in a markup manner in a view of the document, such that indications of the changes and comments are displayed in a margin of the view. The margin has limited space. When there are many changes and comments that are made to a document, the indications of the changes and comments in the margin may be positioned far from the portions of the document that they reference.

SUMMARY

Systems and methods are disclosed herein for combining annotations in a document. One aspect relates to a system or method for combining a first annotation and a second annotation to form a stacked annotation in an electronic document. The first annotation is received and corresponds to a first portion of the electronic document. The second annotation is received and corresponds to a second portion of the electronic document. A first position of a layout rendering of the first annotation is determined, and a second position of a layout rendering of the second annotation is determined. The first position of the layout rendering of the first annotation is compared to the second position of the layout rendering of the second annotation. When the first position conflicts with the second position, the first annotation and the second annotation are combined to form a stacked annotation.

Another aspect relates to a system for combining a first annotation and a second annotation in an electronic document. The system includes means for receiving the first annotation corresponding to a first portion of the electronic document and for receiving the second annotation corresponding to a second portion of the electronic document. The system further includes means for determining a first position of a layout rendering of the first annotation and a second position of a layout rendering of the second annotation, means for comparing the first position of the layout rendering of the first annotation to the second position of the layout rendering of the second annotation, and when the first position conflicts with the second position, means for combining the first annotation and the second annotation to form a stacked annotation.

In some implementations, one of the first annotation and the second annotation is a comment on the corresponding portion of the electronic document, and another of the first annotation and the second annotation is an edit on the corresponding portion of the electronic document. When the first portion precedes the second portion, the first position may be a bottom border of the layout rendering of the first annotation, the second position may be a top border of the layout rendering of the second annotation, and the first position conflicts with the second position when the first position is below the second position.

In some implementations, the system further includes means for receiving, from a user, a first selection of the stacked annotation, and in response to receiving the first selection, means for replacing the stacked annotation with a display of an indication of the first annotation that is separate from an indication of the second annotation. The system may include means for receiving, from the user, a second selection of a separate portion of the electronic document that is outside of the first portion and the second portion, and in response to receiving the second selection, means for replacing the display with the stacked annotation.

In some implementations, the system includes means for receiving a third annotation corresponding to a third portion of the electronic document, wherein the third portion follows the first portion and precedes the second portion, and means for combining the third annotation with the stacked annotation to form a modified stacked annotation. The system may include means for receiving a third annotation corresponding to a third portion of the electronic document, wherein the third portion follows the second portion, means for determining a third position of a layout rendering of the third annotation and a fourth position of a layout rendering of the stacked annotation, means for comparing the third position to the fourth position, and when the third position conflicts with the fourth position, means for combining the third annotation and the stacked annotation to form a modified stacked annotation.

In some implementations, the system includes means for iteratively comparing the stacked annotation to respective received annotations, and means for combining the respective received annotations with the stacked annotation to form modified stacked annotations based on a comparison between a position of a layout rendering of the stacked annotation and a respective position of the respective received annotations. The system may include means for comparing a number of annotations included in the stacked annotation to a maximum number of annotations, wherein the stacked annotation is prohibited from including a number of annotations that exceeds the maximum number of annotations. The system may include means for performing an optimization technique to minimize an objective function that represents an aggregate distance between respective positions of layout renderings of the annotations and respective positions of the corresponding portions in the electronic document.

BRIEF DESCRIPTION OF THE DRAWINGS

The above and other features of the present disclosure, including its nature and its various advantages, will be more apparent upon consideration of the following detailed description, taken in conjunction with the accompanying drawings in which:

FIG. 4 is a diagram of an exemplary display of a user interface for interacting with a document with stacked annotations, according to an illustrative embodiment.

DETAILED DESCRIPTION

To provide an overall understanding of the disclosure, certain illustrative embodiments will now be described, including a system for stacking marginal annotations in a document editor. In particular, stacking marginal annotations allows for a clearer view of a document so that a user, upon initially viewing a document, can quickly understand what changes have been made to a document. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope thereof.

Figure 1:
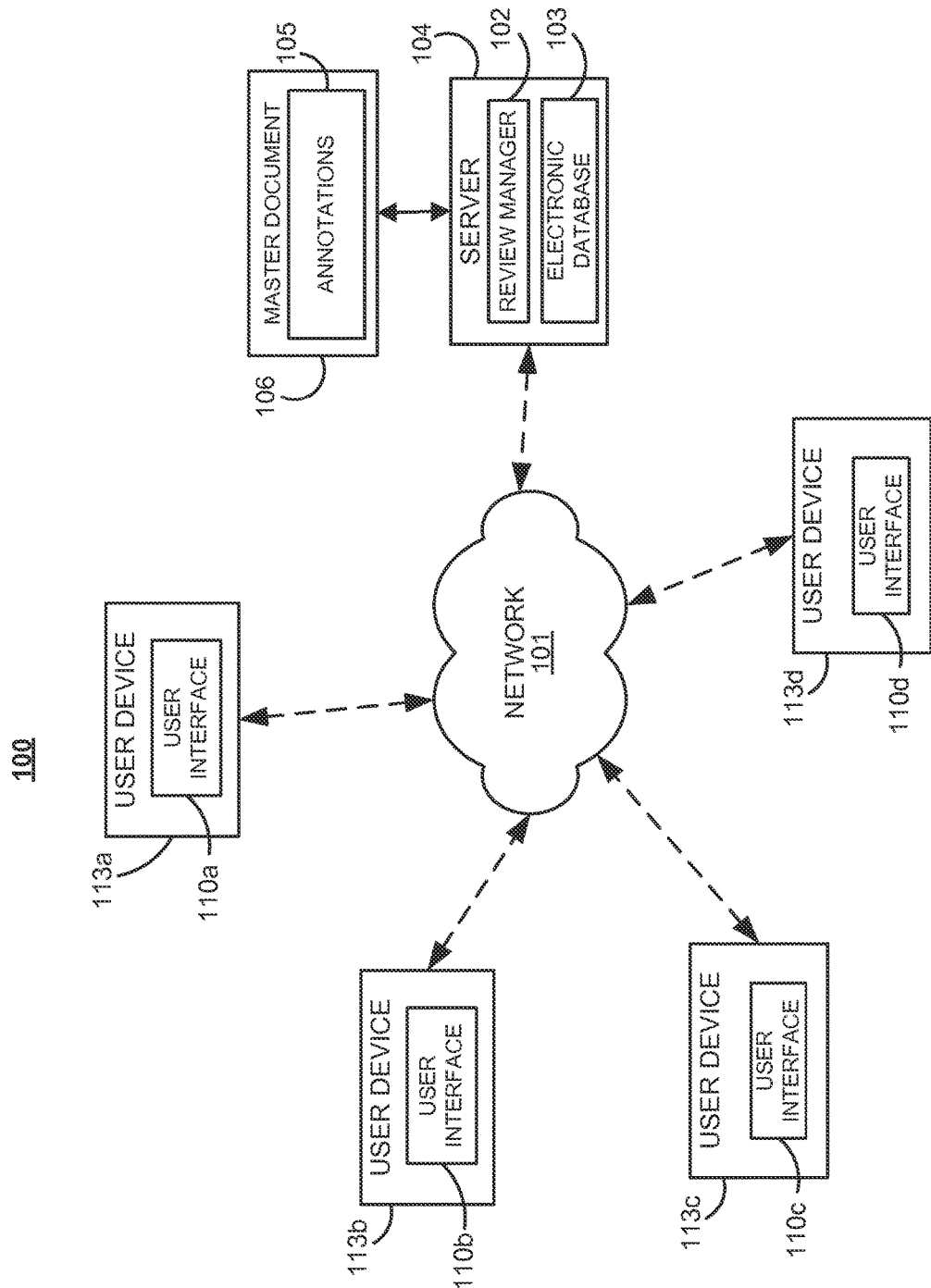
FIG. 1 is a block diagram of a computerized system for managing annotations to an electronic document, according to an illustrative embodiment.
Figure 2:
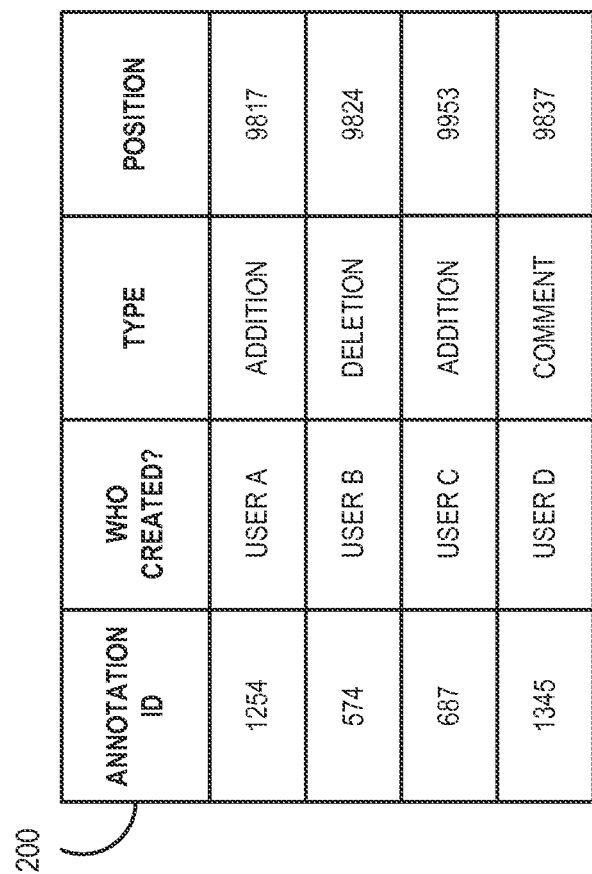
FIG. 2 is an example data structure stored on an electronic database that includes a list of annotations to an electronic document, according to an illustrative embodiment.

FIGS. 1 and 2 are diagrams of a network and a database structure that may be used to implement the systems and methods disclosed herein. FIG. 1 is a block diagram of a computerized system 100 for stacking marginal annotations in an electronic document, according to an illustrative embodiment. System 100 includes a server 104 and four user devices 113a-113d (generally, user device 113) connected over a network 101. The server 104 includes a review manager 102, which manages updates to various versions of a master document 106.

The review manager 102 is configured to transmit and receive data over the network 101 in communication with the user devices 113. In particular, the review manager 102 receives data indicative of changes that a user at a user device 113 wishes to suggest or create related to the master document 106. The data is also indicative of comments that a user at a user device 113 creates that is related to a portion of the master document 106. Depending on the user type, which sets the access permissions for the user to access the master document 106, the review manager 102 then creates these changes by appending to a list of annotations 105 corresponding to the master document 106. The list of annotations 105 may be stored in the form of a data structure, an example of which is described in more detail in relation to FIG. 2.

The review manager 102 may include a processor and a memory unit. The memory unit stores computer executable instructions, which are executed by the processor. The computer executable instructions include instructions for receiving data over the network 101, determining a user type for a given user, making changes in the master document 106, and publishing various versions of the document 106 to various users. As depicted in FIG. 1, the master document 106 is stored on a separate device from the server 104, but the master document 106 may also be stored in the electronic database 103 or even in a memory unit included within the review manager 102. In addition, any data described herein as being stored on the electronic database 103 may instead or additionally be stored in a memory unit in the review manager 102 or on a separate memory unit external to the server 104.

Users at user devices 113 may simultaneously interact with the master document 106 over user interfaces 110a-110d (generally, user interface 110). In particular, FIG. 1 depicts four user devices 113, and each user at the four user devices 113 may be associated with a user type defining a level of authority for access to and editing capabilities of certain versions of the master document. Each user device 113 may include a device such as a personal computer, a laptop computer, a tablet, a smart phone, a personal digital assistant, or any other suitable type of computer or communication device. Users at the user devices access and receive information from the server 104 over the network 101. The user devices 113 may include typical components, for example, an input device, an output device, and a communication interface. A user may authenticate with the server 104 by inputting a user name and password (or providing other identification information) via a user interface, such that the same user device may be used by different users at different times, including users with the same or different user type.

Users interact with the server 104 such that the users, in conjunction with the server 104, generate an online document by collaboratively proposing changes and commenting in the document 106. Although illustrated as a single device in FIG. 1, the server 104 may be implemented as, for example, a single computing device or as multiple distributed computing devices. The interaction of users with the server 104 is through the user interfaces 110, which may include web browsers. For example, the document may be viewed with an application that displays the document within a web browser. In this arrangement, users do not need to install software locally to their user devices to view and make changes in the document. When browsers or user interfaces are discussed herein, these terms are intended to refer to any program that allows a user to browse documents, regardless of whether the browser program is a standalone program or an embedded program, such as a browser program included as part of an operating system. The logic described herein can be implemented in hardware, software, firmware, or a combination thereof.

The users provide suggested changes or comments to the document 106. These suggested changes or comments are referred to herein as "annotations," which may include any change that is made to a corresponding portion of the content of a document or a comment on a corresponding portion of a document. Indications of these annotations may be displayed on a margin displayed adjacent to a view of the document on the user interfaces 110. These indications are referred to herein as "metadata regions," which are shown and described in detail in relation to FIGS. 3 and 4. The metadata regions may include information regarding the annotations, such as the user who created the annotation, the time the annotation was created, the type of annotation, the substance of the annotation, or any suitable combination thereof. It is generally desirable that the metadata regions do not overlap (or "collide") with one another, and the review manager 102 monitors the annotations and their corresponding metadata regions to detect collisions. When a collision is detected, multiple metadata regions or annotations may be combined to form a single stacked metadata region or annotation to save space in the margin.

When the interfaces 110 include web browsers, different versions of the document (for example, a markup version, a clean version, or various historical versions of the document, such as those including a selected group of the suggested and/or accepted edits) may be saved to different network locations. An editor may select which versions of the master document 106 are saved to which network location, and may further select to display a version of the document in a particular format, such as in browser format, print format, or any other suitable format for displaying an electronic document. In addition, a user may select to view the master document 106 including any suggested edit satisfying one or more criteria. As an example, a user may wish to view only suggested edits of a certain type, such as insertions, deletions, replacements, format changes, spelling mistakes, or any other suitable type of suggested edit.

In an example, the document 106 is a text document. One of skill in the art will understand that the features and concepts described herein may be applied in any type of collaborative document application, including, for example, spreadsheet applications, presentation applications, drawing applications, and others.

In certain implementations, each user of the electronic document 106 is associated with a user type. One type of document user is a reviewer, who has certain authority and access to the document. Typically a reviewer may view and make suggested edits and comments on the document 106, but may not accept or reject any of the suggested edits or delete any of the comments made by other users. Another user type is an editor, who has a greater level of authority (i.e., a larger set of permissions) for the document 106 than the reviewer. The editor can accept or reject any suggested edits made by the reviewer, and further can delete any comments made by the reviewer. In addition to accepting or rejecting changes made by the reviewer, the editor also has access to make direct changes to the document by directly editing or to make comments on the document 106. The review manager 102 generally treats edits made by the editor as accepted edits which are automatically accepted. Alternatively, the editor may wish to make a suggested edit in order to get input from the reviewer or other editors regarding the suggested edit. In this case, the editor may mark an edit as "suggested" or may set the user device 109 to operate in "reviewer mode," such that the suggested edit appears in the list of annotations 105 of the document to the reviewer. Access and authority may vary and be customized for a document allowing different access and use capabilities for different users.

The updates to the master document 106 and the list of annotations 105 may be performed nearly in real-time. This means that when a reviewer and an editor are simultaneously viewing and accessing the document, the reviewer receives feedback regarding a suggested edit almost immediately after the editor sends the feedback. Four user devices 113 are shown in FIG. 1 to avoid complicating the drawing; however the system 100 can support any number of users with the same or different user type.

As shown in FIG. 1, the user devices 113 access the master document 106 via the server 104. While the stacking of marginal annotations may be used in the collaborative online document editing environment that is depicted in FIG. 1, one of ordinary skill in the art will understand that the systems and methods of the present disclosure may be implemented in local document editing environments. In the local document editing environment, the master document 106 may be stored directly on a local device, such as the user device 113a, which allows a user at the user device 113a to directly make annotations to the document. Indications of the annotations may be displayed in a marginal display of the document. When displaying the document, the user device 113a may include the functionality of the review manager 102. In particular, the user device 113a may be configured to detect collisions between annotations and resolve these collisions by creating stacked annotations. In this manner, the user device 113a does not need to be connected to the network 101 when the annotations are made.

In certain implementations, each user may be assigned a unique color, such that the changes of a version of the document are color-coded by the user who made the changes. In addition, changes made by editors may be marked differently on view of the document from changes made by reviewers. When displayed in a margin in a display of the document, the annotations that are made by individual users may be marked with the user's color. When a stacked annotation is shown, the stacked annotation may be marked with the set of colors corresponding to users who created the annotations that were combined to create the stack.

FIG. 2 depicts an exemplary data structure 200 that may be stored on the electronic database 103 that includes metadata corresponding to annotations, according to an illustrative embodiment. The data structure 200 includes four records of annotations. Each record in the data structure 200 includes an "annotation id" field whose values include identification numbers for the annotations. Each record in the data structure 200 corresponds to a suggested edit or a comment that is made by a user, such as a reviewer or an editor. Each record further includes the user id of the user who created the annotation, a type associated with the annotation (i.e., addition, deletion, move, replacement, format changes, spelling changes, comment, or any other suitable type of annotation), and a position identifier that indicates a position of the annotation in the electronic document 106. In general, the position identifier may be any suitable identifier, such as a pointer to a location in the document, an address that stores such a pointer, or any other suitable way of referring to a position in a document. In the example illustrated in FIG. 2, the position identifier is a four digit number, which may correspond to distinct locations within the electronic document 106. In general, the position identifier may include a range of positions, such that the position identifier is indicative of a length of the annotation. The length of the annotation may refer to a number of characters or words that are being added, replaced, deleted, or commented on. The data structure 200 indicates that the annotation 1254 is an addition that is made at a position slightly before the annotation 574, which is a deletion. The annotation 1345 is a comment made by user D that occurs at a position that follows the annotation 574. The annotation 687 corresponds to an addition made by user C, which has a position that appears much later than the other three annotations in the data structure 200.

Based on the position identifiers and a relative height of metadata regions associated with the annotations, the review manager 102 may determine that metadata regions associated with the annotations 1254, 574, and 1345, if placed in a margin in a display of the document, would overlap or collide with one another. In this case, the review manager 102 determines to combine multiple annotations into a single stack, such that a stacked metadata region is representative of multiple annotations and does not collide or overlap with other metadata regions. This is described in detail in relation to FIGS. 3 and 4.

The data structure 200 is shown for illustrative purposes only, and other fields with additional data may also be included. Examples of such additional data include a timestamp associated with when the annotation was created, whether the suggested edit was accepted or rejected, who accepted or rejected the suggested edit, and the time of the acceptance or rejection. Furthermore, when a suggested edit includes deleting, moving, or replacing existing objects in the document, the data structure 200 may further include which objects to delete, move, or replace. Similarly, when a suggested edit includes adding objects, the data structure 200 may further include which object(s) to add.

The data structure 200 and the master document 106 may be stored on the same electronic database 103, or may be stored on different databases. In some embodiments, an original version of the master document 106 is stored on a database. For example, the combination of the original version and data structure 200 would be enough to generate versions of the document using a dynamic approach. In particular, if a user wishes to view only a subset of the suggested edits, a version of the document may be generated including the original version and the subset of suggested edits. The subset may include those suggested edits corresponding to a specific user, a user type, or an edit type. The generated version may not be stored on a database. Instead, when a user accesses the document, a version specific to that user (based on the user's settings) may be generated. In addition to the data stored in the example data structure 200, the review manager 102 may also store additional data. For example, data indicative of what time each edit was made may be stored.

Figure 3:
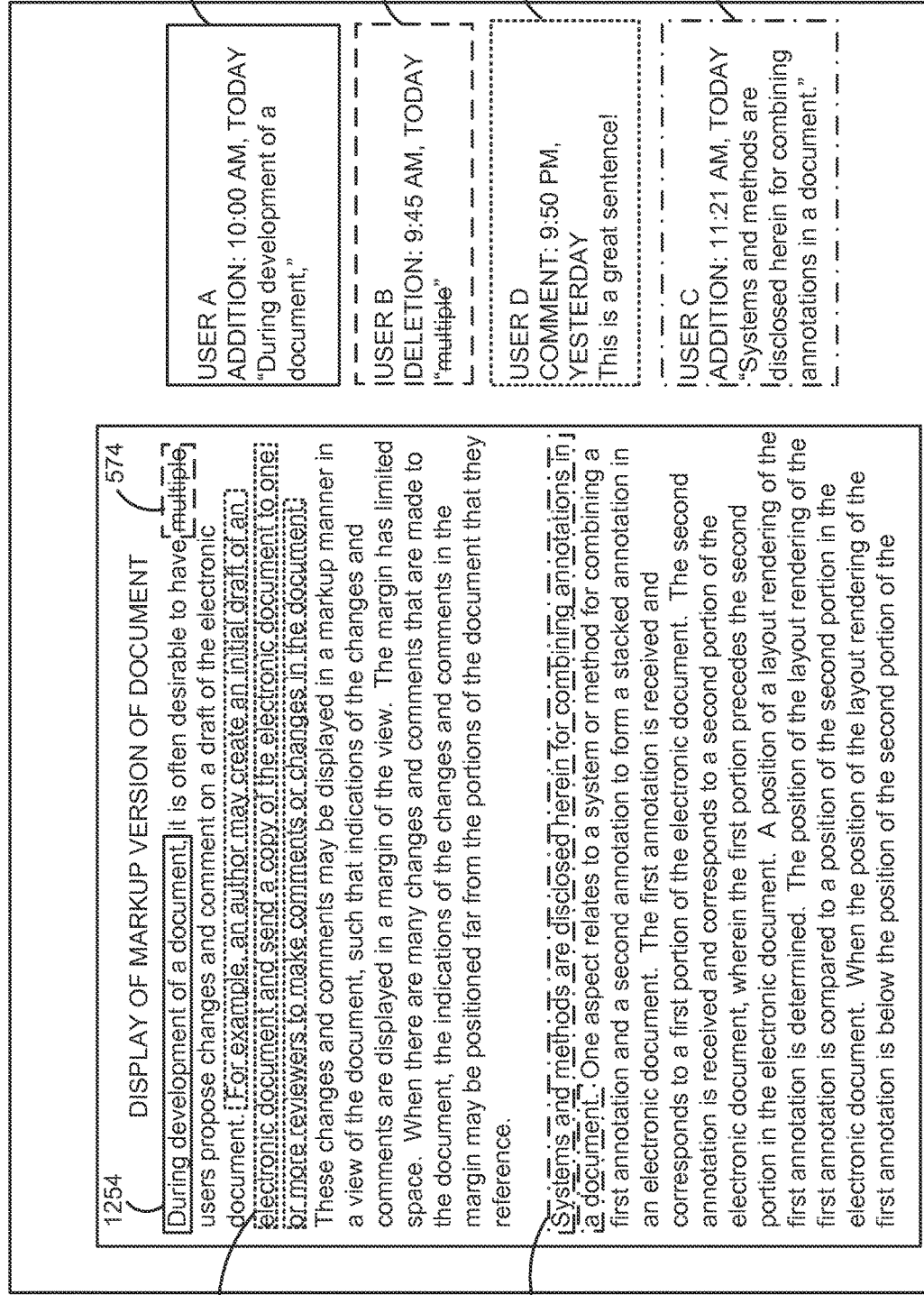
FIG. 3 is a diagram of an exemplary display of a user interface for interacting with a document with unstacked annotations, according to an illustrative embodiment.

FIGS. 3 and 4 are diagrams of exemplary displays of a user interface for users interacting with the master document 106. In particular, FIG. 3 is an exemplary display of a user interface that shows a set of annotations that are unstacked, and FIG. 4 is an exemplary display of a user interface that shows a stack of a subset of the annotations shown in FIG. 3. In FIG. 3, the user interface 300 displays a portion of an original document 106 with the four annotations shown in the data structure 200 of FIG. 2—the annotations 1254, 574, 1345, and 687. In addition, the user interface 300 includes a margin on the right hand side of the display that displays annotation metadata associated with the annotations 1254, 574, 1345, and 687. The margin includes four metadata regions 324, 326, 328, and 330 associated with the annotations 1254, 574, 1345, and 687 respectively. The metadata region 324 includes data indicative of which user made the annotation 1254 (i.e., user A), the annotation type corresponding to the annotation 1254 (i.e., an addition), the time and date the annotation 1254 was made (i.e., 10:00 AM today), and an indication of the object to be added (i.e., "During development of a document."). Similarly, the metadata region 326 indicates that user B deleted the word "multiple" at 9:45 AM today, the metadata region 328 indicates that user D commented on a portion of the document with "This is a great sentence!" at 9:50 PM yesterday, and the metadata region 330 indicates that user C added a sentence to the document at 11:21 AM today. The metadata shown in the metadata regions 324, 326, 328, and 330 may be stored in a data structure such as the data structure 200 shown in FIG. 2.

In FIG. 3, the metadata regions 324, 326, 328, and 330 are shown as being unstacked, meaning that the metadata regions 324, 326, 328, and 330 are displayed in the margin in a non-overlapping manner. Each of the unstacked metadata regions 324, 326, 328, and 330 has a corresponding portion of the document and is displayed in the margin as close to its corresponding portion of the document as is possible without causing the metadata regions 324, 326, 328, and 330 to overlap.

In particular, the metadata region 324 corresponds to a first portion of the first line of the document, such that the metadata region 324 is displayed near the top of the margin. The metadata region 326 corresponds to a second portion of the first line of the document. Since the second portion of the first line follows the first portion of the first line, the metadata region 326 is displayed below the metadata region 324. The height of the metadata region 324 is taller than the height of the first line of the display, such that the metadata region 326 cannot be displayed immediately adjacent to its corresponding portion of the document. In this manner, the unstacked display of the metadata regions in FIG. 3 may not be desirable because not every metadata region is immediately adjacent to its corresponding portion of the document.

The metadata region 328 is shown below the metadata region 326, and is even further displaced from its corresponding portion of the document, which corresponds to the third, fourth, and fifth lines of the document. Because the combined heights of the metadata regions 324 and 326 exceeds the combined heights of the first and second lines of the display of the document, the positioning of the unstacked metadata region 328 is also not immediately adjacent to its corresponding portion of the document. Moreover, even though the metadata region 330 corresponds to a portion of the document that is far below the other portions, the metadata region 330 is also not immediately adjacent to its corresponding portion because of the combined height of the metadata regions 324, 326, and 328. In this manner, unstacked annotations or metadata regions may be undesirable because the metadata regions are not displayed near their corresponding portions of the document.

One way to avoid this undesirable effect of unstacked annotations is to save space by displaying an abbreviated version of each metadata region. For example, the abbreviated version of a metadata region may include only a portion of the information shown in the metadata regions of FIG. 3. In one example, the information in the metadata region 324 may be truncated to include only a portion of the added text followed by an ellipsis (e.g., "During development . . . ") to reduce the height of the metadata region 324. As shown in FIG. 3, the metadata region 324 includes the user identifier in a top line, and an indication of the annotation type (i.e., addition) and the time the annotation was made (i.e., 10:00 AM today) in the second line. This information may be abbreviated to make the information fit on a single line, or to provide shorthand indications. For example, a graphical icon may be displayed instead of or in addition to the user name. The graphical icon may be an image or a design that indicates the identity of user A. Similarly, a graphical icon may be used instead of or in addition to the annotation type. For example, the letter "A" or a "+" symbol may be used to indicate an annotation type of an addition, while the letter "D" or a "−" symbol may be used to indicate an annotation type of a deletion. Other letters or symbols may be used to indicate the other types of annotations, such as comments, punctuation corrections, spelling corrections, or any other suitable type of modification to a document. Moreover, a shorthand version of the time and date that the annotation was created may be displayed (or removed altogether from the metadata regions) to further shorten the metadata regions. Any combination of the example ways to shorten a metadata region may be used.

However, even when the above described ways to shorten a metadata region are used, at least some metadata regions may still not be displayed immediately adjacent to their corresponding portions of the document. In particular, the corresponding portions of the document may be so near each other (such as in the same line or in consecutive lines, for example) that the metadata regions, if placed adjacent to their corresponding portions, would still overlap with one another. In this case, it may be desirable to stack the overlapping metadata regions into a single stacked region, in which the overlapping metadata regions are collapsed into a single stack. The single stack may include only a portion of the information in the overlapping metadata regions, such as a number of metadata regions included in the stack, the types of annotations included in the stack, the users who made the annotations, and any suitable combination thereof.

The user interface 400 in FIG. 4 is similar to the user interface 300, except that the user interface 400 shows the three metadata regions 324, 326, and 328 as being collapsed into a single stacked region 440. As shown in FIG. 4, the stacked region 440 only indicates that three annotations have been made by the users A, B, and D, and does not include other information. In general, the stacked region 440 may include more information regarding the types of annotations or the times that the annotations were made. For example, if all annotations in a stacked region were of one type, the stacked region may indicate the particular type of annotation it includes. When there are multiple different annotation types included in the same stack, it may be undesirable to display all the different annotation types in the stack. In this case, the annotation types may be omitted from the stacked region (such as the example stacked region 440 of FIG. 4), or a shorthand description of the annotation types may be provided in the stacked region (such as the letter "A" or the "+" symbol for an addition, or the letter "D" or the "−" symbol for a deletion, for example). Moreover, the users who created the annotations may be identified using their names or a color, graphical icon, and/or symbol associated with each user.

To determine which metadata regions to group together into a single stack, the relative heights of the metadata regions and their proximity to their corresponding portions of the document may be evaluated. In particular, one pair of metadata regions may be grouped together if they overlap, and at least one metadata region is not immediately adjacent to its corresponding region. The grouped pair of metadata regions formed a stacked region, and the stacked region may be compared to other metadata regions to identify any overlap. If overlap is identified, the overlapping metadata region may be added to the stacked region to include three metadata regions. This process may be repeated until all metadata regions are either included in a stack or are immediately adjacent to their corresponding portions of the document, without any overlap between two metadata regions, two stacked regions, or one metadata region and one stacked region. As shown in FIG. 4, the stacked region 440 only includes the three metadata regions 324, 326, and 328 and does not include the metadata region 430 because the metadata region 430 does not overlap with the stacked region 440.

In one example, when a user clicks on a portion of the document that has a corresponding metadata region, the corresponding metadata region may be highlighted in a manner that distinguishes the corresponding metadata region from other metadata regions of the document. This may also be true when the clicked portion of the document corresponds to a stacked region, such that the stacked region is highlighted in a distinguishing manner when a portion of the document that corresponds to one of the annotations included in the stack is selected. In some implementations, the stacked region is unstacked (and the expanded view of the metadata regions is shown, such as the example of FIG. 3) when a corresponding portion of the document is selected. In one example, when a user clicks on a stacked region, such as the stacked region 440, the stacked region 440 may become unstacked, and the expanded view of the metadata regions may be shown, such as the example of FIG. 3. The unstacked metadata regions may be recombined into the stacked region when the user clicks on a region of the document that is away from all of the portions corresponding to the annotations in the stack.

FIGS. 3 and 4 are exemplary user interfaces and are shown for illustrative purposes only. In particular, one of ordinary skill in the art will appreciate any combination of metadata associated with annotations may be displayed in any number of ways on the user interface. For example, the metadata regions may include only a portion of the text to be added or deleted. When a user selects, via user input (such as with a mouse click or with keyboard input), a region surrounding a portion of the document, such as the suggestion 1254, the corresponding metadata region and/or the suggested edit may be highlighted with color or distinguished in any other way from a remainder of the display of the document.

The user interfaces 300 and 400 show that the portions of the document that correspond to the various annotations are distinguished from a remainder of the document by boxes surrounding the text. However, any method of distinguishing these portions of the document from a remainder of the document may be used, including using different colors for different users, different colors for different types of edits, underlining added items, striking out removed items, redlining the view of the document, or any other suitable method of distinguishing annotations in a document.

In some implementations, the users of a document are each assigned a color. Instead of boxes with different line types surrounding the portions of the document that correspond to annotations (such as is shown in the example of FIGS. 3 and 4), the corresponding portions of the document may be highlighted or otherwise indicated with the user's particular color. The corresponding metadata regions may be indicated with the same color, and there may be lines connecting the portions of the document with the corresponding metadata regions.

In some implementations, a metadata region may include an area for a user to respond to the annotation. For example, a reply text box may be included in the metadata region that allows a user to type a response to or comment on the particular annotation. Once a reply is made, an indication of the user who created the reply, the time the reply was created, and the text of the reply may be displayed within the metadata region. In general, the height of the metadata region may be increased to accommodate room to display the one or more replies that may be made in response to an annotation. The reply text box may still be shown even if one or more replies have already been made, to allow the user a way to continue the discussion regarding a particular annotation. Because the presence of these replies further lengthens the height of the metadata region, the metadata region may be truncated or otherwise shortened, such as by simply showing an indication of a number of replies that have been made in the metadata region. In an example, to reduce the height of the metadata region, the text of the one or more of the replies may be replaced with a graphical icon that indicates the number of replies. For example, a metadata region may include the text of the original annotation and the latest reply, and an accordion-style icon may be displayed between the original annotation and the last reply to indicate a number of replies that were made before the last reply. In some implementations, a stacked region includes this accordion-style icon to indicate the number of annotations that are included within the stack.

Figure 5:
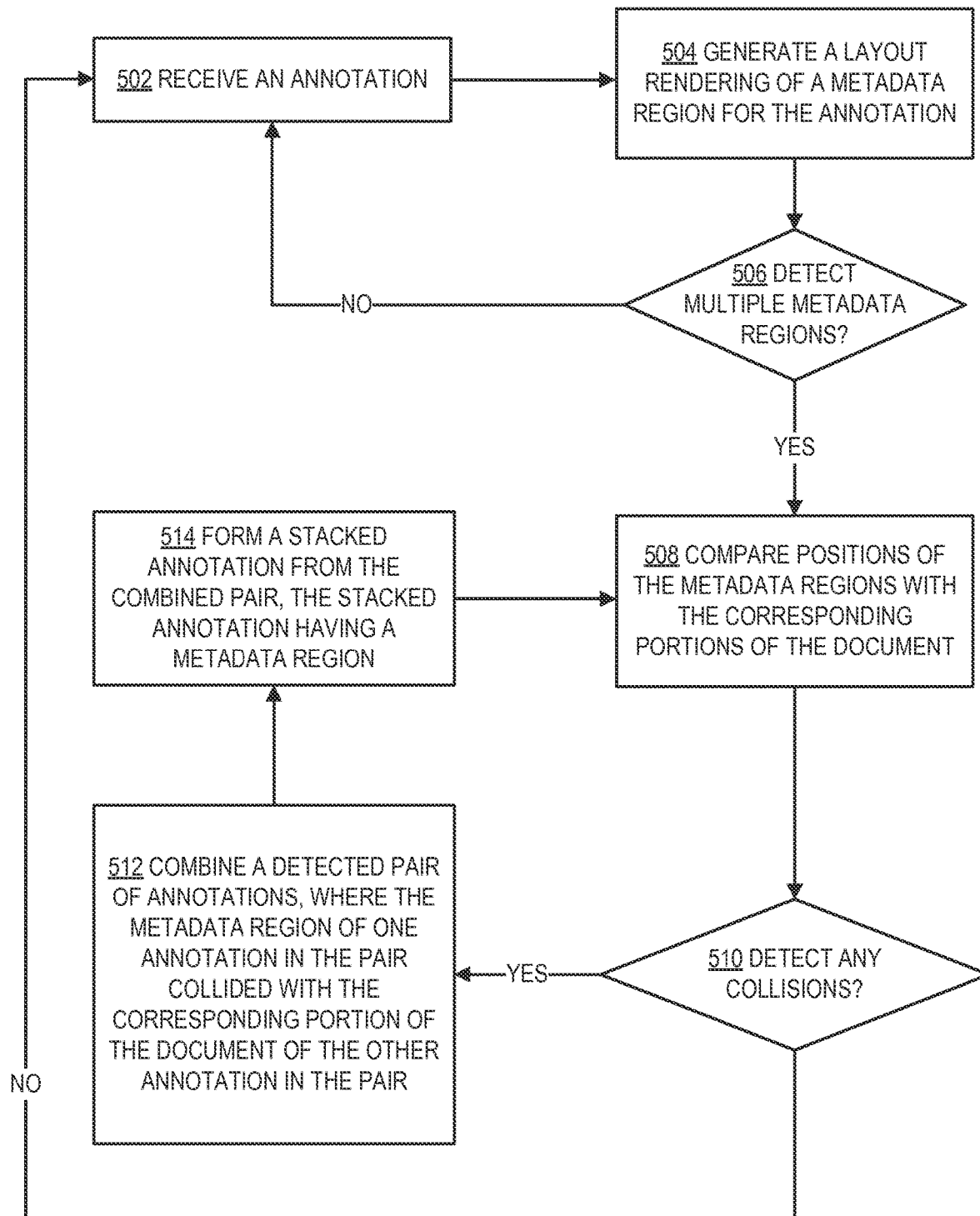
FIG. 5 is a flowchart of a method used by the review manager to manage annotations to a document, according to an illustrative embodiment.

FIG. 5 is an illustrative flow diagram of a process 500 used by the review manager 102 to manage annotations 105 to a document 106. The process 500 includes the steps of receiving an annotation (step 502), generating a layout rendering of a metadata region for the annotation (step 504), and determining whether multiple metadata regions are detected (decision block 506). After multiple metadata regions have been detected, the process 500 further includes comparing the positions of the metadata regions with the corresponding portions of the document (step 508), and determining whether any collisions are detected (decision block 510). If collisions are detected, a detected pair of annotations is combined, where the metadata region of one annotation in the pair collided with the corresponding portion of the document of the other annotation in the pair (step 512), and a stacked annotation is formed from the combined pair (step 514).

At step 502, an annotation of an electronic document is received. As described above, the annotation corresponds to a portion of the document, and may include a suggested change to or a comment on the corresponding portion. In general, suggested changes and comments may not be distinguished from each other by the review manager 102, and may be treated in the same manner as each other. At step 504, the review manager 102 generates a layout rendering of a metadata region for the annotation. Examples of layout renderings of various metadata regions are shown in FIGS. 3 and 4, and are displayed as rectangular regions in a margin on the right hand side of the display of the document. In general, a layout rendering may take any shape, such as ovals, circles, or any polygonal shape with rounded or sharp corners and edges. Moreover, a layout rendering of the annotations and metadata regions may be shown in a different region of the display, such as on the left hand side of the display, on a bottom side or top side of the display, or generally anywhere within the display itself. The layout rendering corresponds to any layout of a metadata region that includes metadata regarding the annotation, such as the user who created the annotation, the time that the annotation was made, an annotation type of the annotation, and the substance of the annotation.

At decision block 506, the review manager 102 detects whether there are multiple metadata regions. Initially, when only one annotation has been received, only one metadata region is created for the annotation. However, when a second annotation is received (from the same user or a different user as the first original annotation), multiple layout renderings of metadata regions have been generated at step 504, and the process 500 proceeds to step 508.

At step 508, the review manager 102 compares positions of the metadata regions with the corresponding portions of the document. As described in relation to FIGS. 3 and 4, the position of a metadata region may correspond to a bottom border of the metadata region, and the position of a portion of the document may be the top border of the portion. In particular, to evaluate whether to combine the metadata regions 324 and 326 into a stacked annotation, the bottom border of the metadata region 324 (i.e., the first annotation) may be compared to the top border of the portion of the document for the annotation 574 (i.e., the second annotation). Since the bottom border of the metadata region 324 is below the top border of the annotation 574, this means that if displayed in an unstacked manner, the metadata region 326 is not immediately adjacent to the portion of the document indicated by the annotation 574. If the metadata region 326 were positioned immediately adjacent to the corresponding portion, then the metadata region 326 would overlap or collide with the metadata region 324, and a collision is detected at decision block 510.

As described herein, the bottom border of the previous metadata region (i.e., the metadata region 324) is compared to the top border of the document portion of the current annotation (i.e., the annotation 574). However, in general, any suitable border may be used, such as the bottom border of a corresponding document portion and/or the top border of a metadata region. Moreover, a position of a metadata region or a position of a corresponding document portion may reflect a center point or line, and not a border of the region or portion. Furthermore, rather than comparing a position of a metadata region to a position of a portion of the document that corresponds to another metadata region, the positions (such as a coordinate of a corner such as the top left corner, a coordinate of the center of the metadata region, or any other suitable coordinate that defines the position of a metadata region, for example) and dimensions (such as the height and/or width, for example) of the metadata regions may be compared directly to determine whether any of the metadata regions would overlap or collide with one another in the display.

At decision block 510, the review manager 102 determines whether any collisions are detected. As explained above, a collision may be detected between two metadata regions when the metadata regions overlap with each other if they are laid out in an individually optimal manner (i.e., if each metadata region is laid out to be immediately adjacent to its corresponding portion of the document). If a collision is detected, the pair of annotations that had colliding metadata regions is combined at step 512 to form a stacked annotation at step 514. The stacked annotation is represented in the form of a stacked metadata region, such as the stacked metadata region 440 of FIG. 4.

Figure 6:
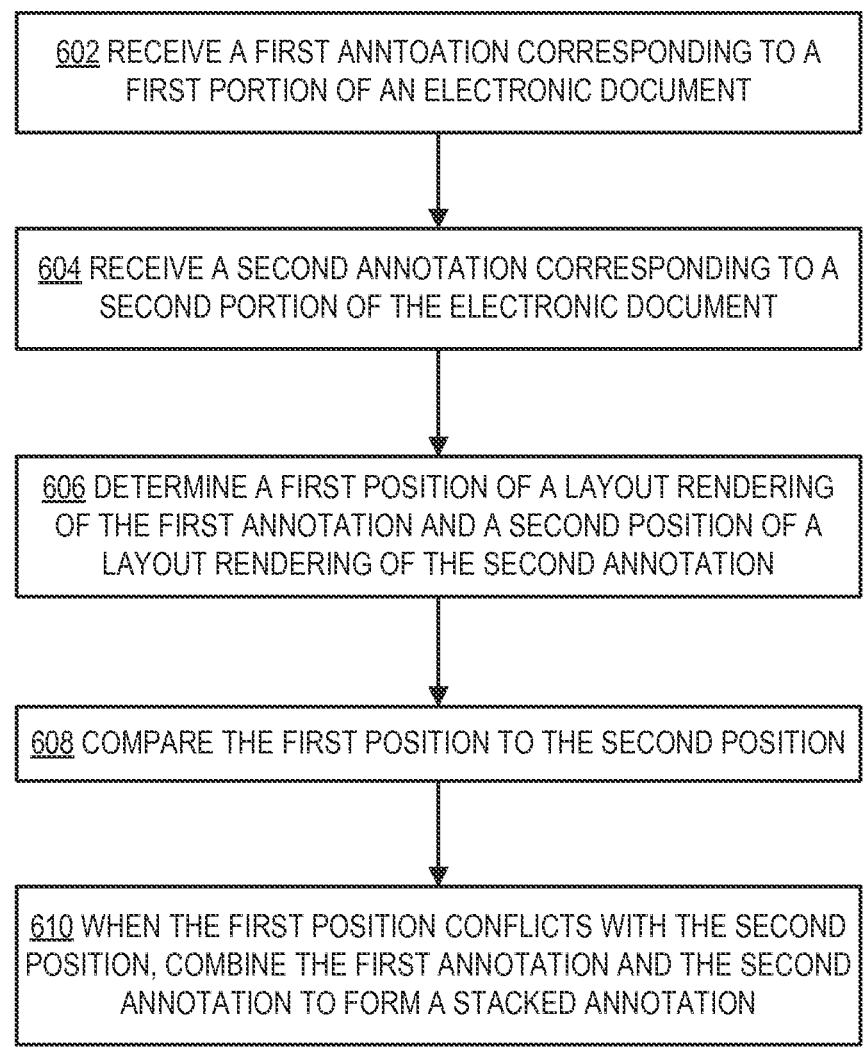
FIG. 6 is a flowchart of a high level method used by the review manager to determine whether to combine annotations in a document, according to an illustrative embodiment.

FIG. 6 is an illustrative flow diagram of a high level process 600 used by the review manager 102 to manage annotations 105 to a document 106. The process 600 includes the steps of receiving a first annotation corresponding to a first portion of an electronic document (step 602), and receiving a second annotation corresponding to a second portion of the electronic document (step 604). The process 600 further includes the steps of determining a first position of a layout rendering of the first annotation and a second position of a layout rendering of the second annotation (step 606), comparing the first position to the second position (step 608), and when the first position conflicts with the second position, combining the first annotation and the second annotation to form a stacked annotation (step 610).

At step 602, a first annotation corresponding to a first portion of the electronic document is received. At step 604, a second annotation corresponding to a second portion of the electronic document is received. The first portion may be the same as the second portion, or may overlap in part or in full with the second portion, or may not have any overlap at all with the second portion in the electronic document. In one example, the first portion may be the same as the second portion. In this case, the metadata regions for the first annotation and the second annotation would automatically collide with each other, and the first and second annotations may be automatically stacked in response to detecting that the first portion is the same as the second portion. In another example, the first portion may precede the second portion in the document, such that in the display of the document, the first portion is positioned above or to the left of the second portion. The first annotation, the second annotation, or both annotations may correspond to a suggested change to the corresponding portion of the document or a comment on the corresponding portion of the document. In general, suggested changes and comments may not be distinguished from each other, and may be treated in the same manner as each other. The first annotation and the second annotation may be consecutive, such that no annotations (e.g., suggested changes or comments, for example) occur between the first and second portions of the document.

At step 606, a first position of a layout rendering of the first annotation is determined, and a second position of a layout rendering of the second annotation is determined. In one example, the layout rendering of the first annotation corresponds to a metadata region that includes metadata regarding the first annotation, such as the user who created the first annotation, the time that the first annotation was made, an annotation type of the first annotation, and the substance of the annotation. Similarly, the layout rendering of the second annotation may correspond to a metadata region that includes the same or different metadata regarding the second annotation. As shown and described in relation to FIGS. 3 and 4, the substance of the annotation may include an indication of text that is suggested to be added, deleted, or replaced, or the substance of the annotation may include a comment on a corresponding portion of the document. The layout rendering may include a rectangular shaped region in a margin of a view of the document, such as the example metadata regions shown in FIGS. 3 and 4.

At step 608, the first position is compared to the second position. When the layout renderings are metadata regions in a margin view of the document, such as the example metadata regions shown in FIGS. 3 and 4, the position of the layout rendering may correspond to a top or bottom border of the layout rendering. As described above, when the first portion of the document corresponding to the first annotation and the second portion of the document corresponding to the second annotation are the same, the layout renderings of the metadata regions for the first and second annotations may have exactly the same position. In another example, when the first portion precedes the second portion within the electronic document, the first position may correspond to a bottom border, and the second position may correspond to a top border. In other words, the bottom border of the first metadata region for the first annotation is compared to the top border of the second metadata region for the second annotation, to see if the there is a conflict. In an example, a conflict would occur when the top border of the second metadata region is higher than the bottom border of the first metadata region, as this would signal an overlap or a collision between the two metadata regions. Alternatively, when the first portion precedes the second portion within the electronic document, the bottom border of the first metadata region may be compared to the top border of the portion of the document that corresponds to the second annotation. In this example, the bottom border of the layout rendering is compared to the top border of the second portion of the electronic document.

At step 610, when the first position conflicts with the second position, the first annotation and the second annotation are combined to form a stacked annotation. When the first position conflicts with the second position, the annotations collide with each other. A collision between the first and second annotations means that if the metadata regions for both of the first and second annotations were rendered and positioned immediately adjacent their corresponding portions of the document, the metadata regions would overlap or collide with each other. This may occur when the first and second portions of the document that correspond to the first and second annotations, respectively, are the same or are positioned closely enough to cause the metadata regions to overlap. As described in relation to FIG. 5, in some implementations, when the bottom border of the layout rendering falls below the top border of the second portion of the electronic document, this may be referred to herein as a collision between the first and second annotations. To avoid the collision from occurring, the unstacked metadata regions may be positioned such that there is not any overlap between any two annotations. However, when non-overlapping unstacked metadata regions are displayed, this could mean that one or more of the unstacked metadata regions are not near their corresponding portions of the document. To avoid this undesirable consequence, the first and second annotations are combined into a stacked annotation, such as is shown in FIG. 4.

In some implementations, a user clicks on the stacked annotation to cause the stacked annotation (e.g., FIG. 4) to become unstacked (e.g., FIG. 3). In the unstacked display, the first and second annotations (and any other annotations included in the stacked annotation) are displayed separately from one another. After the annotations are unstacked, the user may click on a portion of the electronic document that is outside of the first portion and the second portion (and any other portions corresponding to annotations included in the previously stacked annotation). When the user selects the outside portion of the electronic document, the unstacked annotations are re-stacked to form the stacked annotation again.

In some implementations, additional annotations are received and considered for combining with other annotations, including individual annotations as well as stacked annotations. For example, a third annotation may be received that corresponds to a third portion of the electronic document. If the third portion is in between the two portions of the document that correspond to the first and second annotations, then the stacked annotation (that already includes the first and second annotations) may be automatically expanded to include the third annotation. For example, the review manager 102 may recognize that a text cursor is within a portion of the document that is represented by the stacked annotation, and in response, may automatically expand the stack to include any suggestions that are made within the portion. In this case, it may be understood that the metadata region for the third annotation, if rendered, would overlap or collide with the metadata region for the stacked annotation. The resulting combination of the first, second, and third annotations may be referred to as an updated or modified stacked annotation. In some implementations, the stacked annotation may only be displayed or updated after any additional suggestions to the portion represented by the stack are complete, which may be indicated by a user selection of a different area of the document.

Alternatively, if the third annotation corresponds to a third portion of the electronic document that occurs after the two portions of the document that correspond to the first and second annotations, then a comparison is made to determine whether to combine the third annotation with the stacked annotation. In particular, the step 606 may be performed for the stacked annotation, such that the position of the layout rendering of the stacked annotation is determined (such as the bottom border of the metadata region for the stacked annotation, for example). Then, step 608 may be performed for the third portion, such that the position of the layout rendering of the stacked annotation is compared to a position of the third portion of the electronic document (such as the top border of the third portion, for example). Then, step 610 may be performed for the current stacked annotation and the third annotation, such that the stacked annotation and the third annotation are combined to form a modified stacked annotation, when the stacked annotation would collide with the third annotation (e.g., when the bottom border of the stacked annotation falls below the top border of the third portion).

In general, the systems and methods of the present disclosure may receive any number of annotations related to different portions of a document from any number of users. As these annotations are received, the annotations may be iteratively compared to neighboring annotations (whether they are single annotations or stacked annotations) to identify any collisions. Collisions may be identified by comparing layout renderings or metadata region positioning of the annotations with the portions of the document to which the annotations correspond. If collisions occur, then annotations are combined to form stacks of annotations.

As described herein, pairs of annotations are combined into stacks in an iteration, and multiple iterations may be performed as additional annotations are received. In general, any number of annotations may be combined into a stack in a single iteration. In the example shown in FIG. 3, the three annotations 1254, 574, and 1345 were similarly positioned, such that even in the absence of the metadata region 326, the presence and height of the metadata region 324 would mean that the metadata region 328 would not be positioned adjacent to its corresponding portion. This may be detected in a single iteration, such that all three annotations could be combined into a single stack in one step.

In some implementations, an optimization technique is used to determine whether to stack annotations, and which annotations to stack together. An objective function of the optimization may be to reduce or minimize a total distance metric that is evaluated between the metadata regions and the corresponding portions of the document associated with each metadata region. In particular, the total distance metric may be an aggregate sum of a set of individual differences, each individual difference corresponding to the difference in a vertical coordinate between a portion of the document and its metadata region. This individual difference may correspond to the difference between the top border of the corresponding portion of the document and the top border of the metadata region, for example. Similarly, the middle or the bottom borders may be used, or a bottom border of the portion may be compared to a top border of the metadata region. In general, any suitable edges or borders may be used to compute the individual differences. The same stacked metadata region may correspond to multiple portions of the document, such that the individual distance is evaluated for each individual portion relative to the same stacked metadata region. These individual differences may be summed across the various annotations to compute the total distance metric, and it may be desirable to adjust the stacks to minimize or reduce the total distance metric. By minimizing or reducing the total distance metric, the optimization technique ensures that the metadata regions are positioned near their corresponding portions of the document in an optimal manner.

The optimization technique may be subject to one or more constraints, such as limiting the number of stacks, limiting the size of each stack, or a combination of both. For example, it may be undesirable to have a stack with many annotations within the stack. A large number of annotations within the same stack may be unwieldy and may collapse too much information into a single metadata region. In this manner, a maximum limit may be placed on the number of annotations that may be included within the same stack before a new stack (that may be placed immediately below the previous stack) is generated. Thus, the optimization technique may be performed such that annotations are combined to form stacks of annotations, but without allowing a stack to exceed a maximum number of annotations. This constraint may set a maximum limit to the number of stacked annotations in a document, a page, or any other suitable limit. Thus, the optimization technique may be performed such that the annotations are combined to form stacks of annotations, but without allowing the number of stacks to exceed a maximum number. In some implementations, a maximum number of annotations is set that can be displayed as unstacked at a time. For example, when a stacked annotation that includes a large number N of annotations is unstacked, only a subset of the N annotations may be displayed, such as the top K annotations, where K is less than N. An option such as a "show more" link may be displayed to display the remaining N-K annotations as unstacked. In some implementations, when a user selects a document portion that corresponds to an individual annotation that is included within a stacked annotation, rather than unstacking the entire stack, only the corresponding individual annotation is shown.

As described herein, most of the examples of the present disclosure relate to annotations that are displayed in a margin on the right hand side of a document, where annotations are ordered and displayed in a vertical manner. In other words, the annotations shown in FIGS. 3 and 4 are displayed along a vertical axis and all have the same (or similar) horizontal coordinate. Collisions between the annotations in this case may be detected by comparing a vertical (or y-axis) coordinate of the bottom border of one annotation to a vertical (or y-axis) coordinate of the top border of another annotation. The examples shown in FIGS. 3 and 4 may be suitable for a document that is vertically long and involves significant scrolling in the vertical direction. In some implementations, rather than being displayed along a vertical axis, the annotations may be displayed along a horizontal axis and may have the same (or similar) vertical coordinate. Such an implementation may be suitable for a document that is horizontally long and involves significant scrolling in the horizontal direction.

In some implementations of the present disclosure, annotations are not limited to any particular axis. In this case, annotations or metadata regions may be assigned an ordered pair of coordinates and may be displayed at any location on a two-dimensional display screen. Assigning the annotations to two coordinates may be suitable for a document having image or drawing data, or that involves scrolling in both the horizontal and vertical directions. To check for collisions between annotations in this situation, both coordinates and the dimensions (e.g., height and width) of each annotation may be considered. In particular, collisions or overlaps may be checked not just in the vertical dimension, but also in the horizontal dimension. Annotations that overlap or collide with one another may be combined to into a stacked annotation, which may be positioned at the centroid or geometric center of the individual annotations that are combined. One of ordinary skill in the art will understand that the systems and methods of the present disclosure are applicable to annotations that are displayed on a two-dimensional coordinate system, as well as along a one-dimensional axis.

Figure 7:
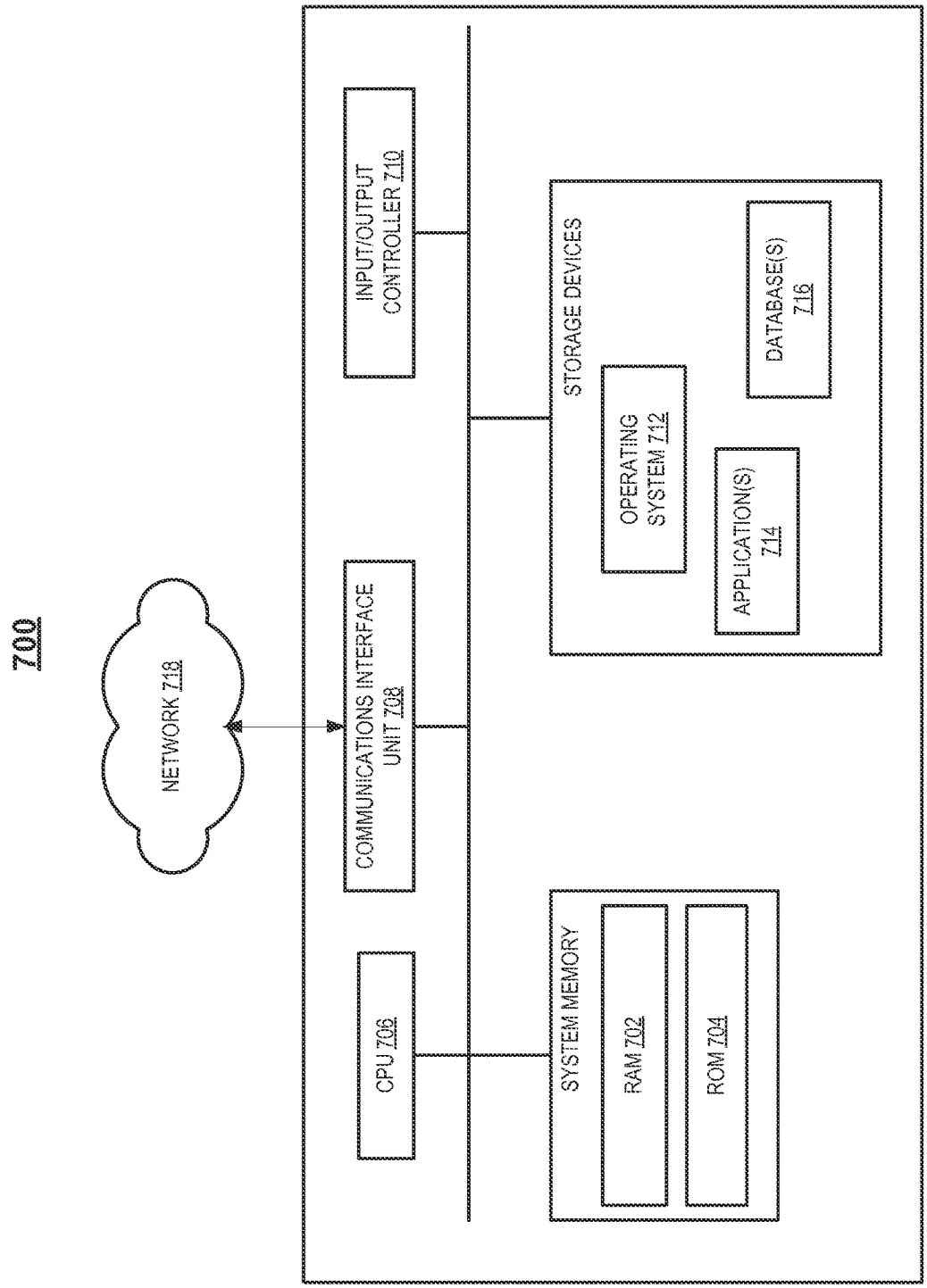
FIG. 7 is a block diagram of a computing device for performing any of the processes described herein, according to an illustrative embodiment.

FIG. 7 is a block diagram of a computing device, such as any of the components of the system of FIG. 1, for performing any of the processes described herein. Each of the components of these systems may be implemented on one or more computing devices 700. In certain aspects, a plurality of the components of these systems may be included within one computing device 700. In certain implementations, a component and a storage device may be implemented across several computing devices 700.

The computing device 700 comprises at least one communications interface unit, an input/output controller 710, system memory, and one or more data storage devices. The system memory includes at least one random access memory (RAM 702) and at least one read-only memory (ROM 704). All of these elements are in communication with a central processing unit (CPU 706) to facilitate the operation of the computing device 700. The computing device 700 may be configured in many different ways. For example, the computing device 700 may be a conventional standalone computer or alternatively, the functions of computing device 700 may be distributed across multiple computer systems and architectures. In FIG. 7, the computing device 700 is linked, via network or local network, to other servers or systems.

The computing device 700 may be configured in a distributed architecture, wherein databases and processors are housed in separate units or locations. Some units perform primary processing functions and contain at a minimum a general controller or a processor and a system memory. In distributed architecture implementations, each of these units may be attached via the communications interface unit 708 to a communications hub or port (not shown) that serves as a primary communication link with other servers, client or user computers and other related devices. The communications hub or port may have minimal processing capability itself, serving primarily as a communications router. A variety of communications protocols may be part of the system, including, but not limited to: Ethernet, SAP, SAS™, ATP, BLUETOOTH™, GSM and TCP/IP.

The CPU 706 comprises a processor, such as one or more conventional microprocessors and one or more supplementary co-processors such as math co-processors for offloading workload from the CPU 706. The CPU 706 is in communication with the communications interface unit 708 and the input/output controller 710, through which the CPU 706 communicates with other devices such as other servers, user terminals, or devices. The communications interface unit 708 and the input/output controller 710 may include multiple communication channels for simultaneous communication with, for example, other processors, servers or client terminals.

The CPU 706 is also in communication with the data storage device. The data storage device may comprise an appropriate combination of magnetic, optical or semiconductor memory, and may include, for example, RAM 702, ROM 704, flash drive, an optical disc such as a compact disc or a hard disk or drive. The CPU 706 and the data storage device each may be, for example, located entirely within a single computer or other computing device; or connected to each other by a communication medium, such as a USB port, serial port cable, a coaxial cable, an Ethernet cable, a telephone line, a radio frequency transceiver or other similar wireless or wired medium or combination of the foregoing. For example, the CPU 706 may be connected to the data storage device via the communications interface unit 708. The CPU 706 may be configured to perform one or more particular processing functions.

The data storage device may store, for example, (i) an operating system 712 for the computing device 700; (ii) one or more applications 714 (e.g., computer program code or a computer program product) adapted to direct the CPU 706 in accordance with the systems and methods described here, and particularly in accordance with the processes described in detail with regard to the CPU 706; or (iii) database(s) 716 adapted to store information that may be utilized to store information required by the program.

The operating system 712 and applications 714 may be stored, for example, in a compressed, an uncompiled and an encrypted format, and may include computer program code. The instructions of the program may be read into a main memory of the processor from a computer-readable medium other than the data storage device, such as from the ROM 704 or from the RAM 702. While execution of sequences of instructions in the program causes the CPU 706 to perform the process steps described herein, hard-wired circuitry may be used in place of, or in combination with, software instructions for implementation of the processes of the present disclosure. Thus, the systems and methods described are not limited to any specific combination of hardware and software.

Suitable computer program code may be provided for performing one or more functions in relation to any of the processes as described herein. The program also may include program elements such as an operating system 712, a database management system and "device drivers" that allow the processor to interface with computer peripheral devices (e.g., a video display, a keyboard, a computer mouse, etc.) via the input/output controller 710.

The term "computer-readable medium" as used herein refers to any non-transitory medium that provides or participates in providing instructions to the processor of the computing device 700 (or any other processor of a device described herein) for execution. Such a medium may take many forms, including but not limited to, non-volatile media and volatile media. Non-volatile media include, for example, optical, magnetic, or opto-magnetic disks, or integrated circuit memory, such as flash memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other non-transitory medium from which a computer can read.

Various forms of computer readable media may be involved in carrying one or more sequences of one or more instructions to the CPU 706 (or any other processor of a device described herein) for execution. For example, the instructions may initially be borne on a magnetic disk of a remote computer (not shown). The remote computer can load the instructions into its dynamic memory and send the instructions over an Ethernet connection, cable line, or even telephone line using a modem. A communications device local to a computing device 700 (e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

What is claimed is:

1. A method for combining a plurality of metadata regions associated with a plurality of edits of an electronic document, the method comprising:
    providing, by a processor, a presentation of a first metadata region of the plurality of metadata regions in a first position of a margin of the electronic document and a second metadata region of the plurality of metadata regions in a second position of the margin of the electronic document, wherein the first metadata region is related to a first edit of the plurality of edits that changes first data in a first portion of the electronic document, and wherein the second metadata region is related to a second edit of the plurality of edits that changes second data in a second portion of the electronic document;
    detecting, based on a vertical position and a combined height of two or more of the plurality of metadata regions, an event indicative of an overlap of the two or more of the plurality of metadata regions; and
    responsive to detecting, based on the vertical position and the combined height of the two or more of the plurality of metadata regions, the event indicative of the potential overlap of the two or more of the plurality of metadata regions, providing a presentation of a stacked metadata region in the margin of the electronic document, wherein the stacked metadata region combines the first metadata region and the second metadata region.

2. The method of claim 1, wherein the presentation of the stacked metadata region provides an abbreviated version of information in the first metadata region and the second metadata region.

3. The method of claim 1, wherein the first edit of the plurality of edits that changes the first data in the first portion of the electronic document and the second edit of the plurality of edits that changes the second data in the second portion of the electronic document comprise edits to a same line of the electronic document.

4. The method of claim 1, wherein detecting the event indicative of the overlap of two or more of the plurality of metadata regions comprises:
    receiving a third edit of the plurality of edits for third data in a third portion of the electronic document; and
    determining that a third position of a third metadata region of the plurality of metadata regions in the margin of the electronic document is to cause the overlap of the two or more of the plurality of metadata regions.

5. The method of claim 4, further comprising:
    providing a presentation of the third metadata region along with the presentation of the stacked metadata region in the margin of the electronic document.

6. The method of claim 1, further comprising:
    receiving a user selection of the stacked metadata region; and
    responsive to the user selection of the stacked metadata region, providing information pertaining to the first metadata region and the second metadata region.

7. The method of claim 1, wherein the first metadata region comprises information indicative of the first edit.

8. The method of claim 6, wherein the information of the first metadata region comprises an indication of a user that created the first edit.

9. The method of claim 7, wherein the information of the first metadata region comprises an indication of a type of edit for the first edit.

10. The method of claim 9, wherein the type of edit comprises an indication that the first edit is an addition or a deletion of the first data of the electronic document.

11. The method of claim 9, wherein the information of the first metadata region comprises an indication of a substance of the first edit, wherein the indication of the substance of the first edit is presented to follow the type of the first edit.

12. The method of claim 2, wherein the presentation of the stacked metadata region provides an abbreviated version of the information as a single line of information.

13. A system for combining a plurality of metadata regions associated with a plurality of edits of an electronic document, the system comprising:
    a memory; and
    a processor, coupled to the memory, the processor to:
        provide a presentation of a first metadata region of the plurality of metadata regions in a first position of a margin of the electronic document and a second metadata region of the plurality of metadata regions in a second position of the margin of the electronic document, wherein the first metadata region is related to a first edit of the plurality of edits that changes first data in a first portion of the electronic document, and wherein the second metadata region is related to a second edit of the plurality of edits that changes second data in a second portion of the electronic document;
        detect, based on a vertical position and a combined height of two or more of the plurality of metadata regions, an event indicative of an overlap of the two or more of the plurality of metadata regions; and
        responsive to detecting, based on the vertical position and the combined height of the two or more of the plurality of metadata regions, the event indicative of the overlap of the two or more of the plurality of metadata regions, provide a presentation of a stacked metadata region in the margin of the electronic document, wherein the stacked metadata region combines the first metadata region and the second metadata region.

14. The system of claim 13, wherein the presentation of the stacked metadata region provides an abbreviated version of information in the first metadata region and the second metadata region.

15. The system of claim 13, wherein the first edit of the plurality of edits that changes the first data in the first portion of the electronic document and the second edit of the plurality of edits that changes the second data in the second portion of the electronic document comprise edits to a same line of the electronic document.

16. The system of claim 13, wherein to detect the event indicative of the overlap of two or more of the plurality of metadata regions, the processor to:
    receive a third edit of the plurality of edits for third data in a third portion of the electronic document; and
    determine that a third position of a third metadata region of the plurality of metadata regions in the margin of the electronic document is to cause the overlap of the two or more of the plurality of metadata regions.

17. A non-transitory computer-readable medium comprising instructions for combining a plurality of metadata regions associated with a plurality of edits of an electronic document that, responsive to execution by a processor, cause the processor to perform operations comprising:
providing, by the processor, a presentation of a first metadata region of the plurality of metadata regions in a first position in a margin of the electronic document and a second metadata region of the plurality of metadata regions in a second position of the margin of the electronic document, wherein the first metadata region is related to a first edit of the plurality of edits that changes first data in a first portion of the electronic document, and wherein the second metadata region is related to a second edit of the plurality of edits that changes second data in a second portion of the electronic document;
detecting, based on a vertical position and a combined height of two or more of the plurality of metadata regions, an event indicative of an overlap of the two or more of the plurality of metadata regions; and
responsive to detecting, based on the vertical position and the combined height of the two or more of the plurality of metadata regions, the event indicative of the overlap of the two or more of the plurality of metadata regions, providing a presentation of a stacked metadata region in the margin of the electronic document, wherein the stacked metadata region combines the first metadata region and the second metadata region.

18. The non-transitory computer-readable medium of claim 17, wherein the presentation of the stacked metadata region provides an abbreviated version of information in the first metadata region and the second metadata region.

19. The non-transitory computer-readable medium of claim 17, wherein the first edit of the plurality of edits that changes the first data in the first portion of the electronic document and the second edit of the plurality of edits that changes the second data in the second portion of the electronic document comprise edits to a same line of the electronic document.

20. The non-transitory computer-readable medium of claim 17, wherein detecting the event indicative of the overlap of two or more of the plurality of metadata regions comprises:
receiving a third edit of the plurality of edits for third data in a third portion of the electronic document;
determining that a third position of a third metadata region of the plurality of metadata regions in the margin of the electronic document is to cause the overlap of the two or more of the plurality of metadata regions; and
providing a presentation of the third metadata region along with the presentation of the stacked metadata region in the margin of the electronic document.

* * * * *